United States Patent
Nomura

(10) Patent No.: US 9,098,909 B2
(45) Date of Patent: Aug. 4, 2015

(54) THREE-DIMENSIONAL DISTANCE MEASUREMENT APPARATUS, THREE-DIMENSIONAL DISTANCE MEASUREMENT METHOD, AND NON-TRANSITORY COMPUTER-READABLE STORAGE MEDIUM

(75) Inventor: Osamu Nomura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 732 days.

(21) Appl. No.: 13/412,738

(22) Filed: Mar. 6, 2012

(65) Prior Publication Data

US 2012/0236317 A1    Sep. 20, 2012

(30) Foreign Application Priority Data

Mar. 16, 2011    (JP) ................. 2011-058298

(51) Int. Cl.
*G06T 7/00* (2006.01)
*G01B 11/02* (2006.01)
*G01B 11/25* (2006.01)

(52) U.S. Cl.
CPC ............ *G06T 7/0057* (2013.01); *G01B 11/026* (2013.01); *G01B 11/25* (2013.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 6,677,942 | B1 * | 1/2004 | Rushmeier et al. | 345/420 |
| 6,700,669 | B1 * | 3/2004 | Geng | 356/603 |
| 6,744,914 | B1 | 6/2004 | Rubbert et al. | |
| 7,463,259 | B1 * | 12/2008 | Kolb et al. | 345/426 |
| 8,845,107 | B1 * | 9/2014 | Coley et al. | 353/28 |
| 2004/0151365 | A1 * | 8/2004 | An Chang et al. | 382/154 |
| 2004/0169651 | A1 * | 9/2004 | Everitt et al. | 345/426 |
| 2006/0268153 | A1 * | 11/2006 | Rice et al. | 348/370 |
| 2008/0266294 | A1 * | 10/2008 | Osman | 345/426 |
| 2012/0140243 | A1 * | 6/2012 | Colonna de Lega | 356/609 |
| 2013/0071010 | A9 * | 3/2013 | Gharib et al. | 382/154 |

FOREIGN PATENT DOCUMENTS

| | | |
|---|---|---|
| JP | 2006-058091 A | 3/2006 |
| JP | 2008-276743 A | 11/2008 |

OTHER PUBLICATIONS

J. Geng, "Structured-light 3D surface imaging: a tutorial," Adv. Opt. Photon. 3, 128-160 (Mar. 31, 2011).*
Salvi, S. Fernandez, T. Pribanic, X. Llado, A state of the art in structured light patterns for surface profilometry, Pattern Recognition, vol. 43, Issue 8, Aug. 2010, pp. 2666-2680, ISSN 0031-3203.*
T.P. Koninckx, et al., "Real-time Range Scanning of Deformable Surfaces by Adaptively Coded Structured Light", 3DIM 2003, Proceedings, Fourth International Conference, 293-300.

(Continued)

*Primary Examiner* — Randolph I Chu
*Assistant Examiner* — Nathan Bloom
(74) *Attorney, Agent, or Firm* — Fitzpatrick, Cella, Harper & Scinto

(57) ABSTRACT

A three-dimensional distance measurement apparatus comprising: a distance information calculation unit configured to calculate distance information of a measurement object based on a captured image of the measurement object on which pattern light is projected; and a local pattern setting unit configured to adaptively set a spatial resolution of measurement points of the pattern light for each local region, wherein the local pattern setting unit sets the spatial resolution of the measurement points of the pattern light based on information about an arithmetic amount of the distance information calculation unit.

12 Claims, 13 Drawing Sheets

(56) References Cited

OTHER PUBLICATIONS

V. Lepeitit et al., "Keypoint recognitions using randomized trees", IEEE Transactions on Pattern Analysis and Machine Intelligence, vol. 28, No. 9, 2006.

D.G. Lowe, "Fitting parameterized three-dimensional models to images", IEEE Transactions on Pattern Analysis and Machine Intelligence, vol. 13, No. 5, pp. 441-450, 1991.

Seiji Iguchi and Kosuke Sato, "Three-Dimensional Image Measurement", Shokodo, 1990.

* cited by examiner

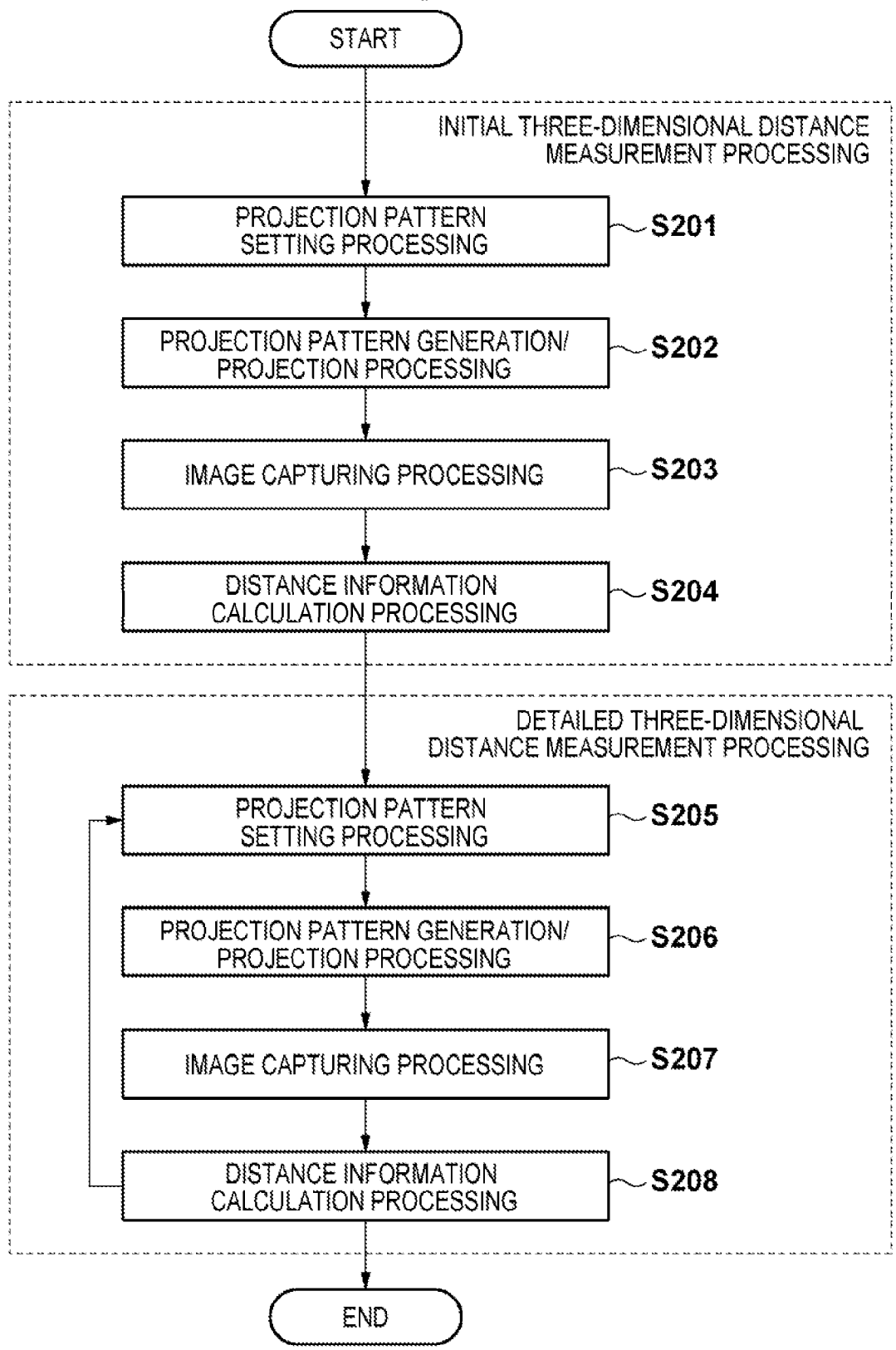

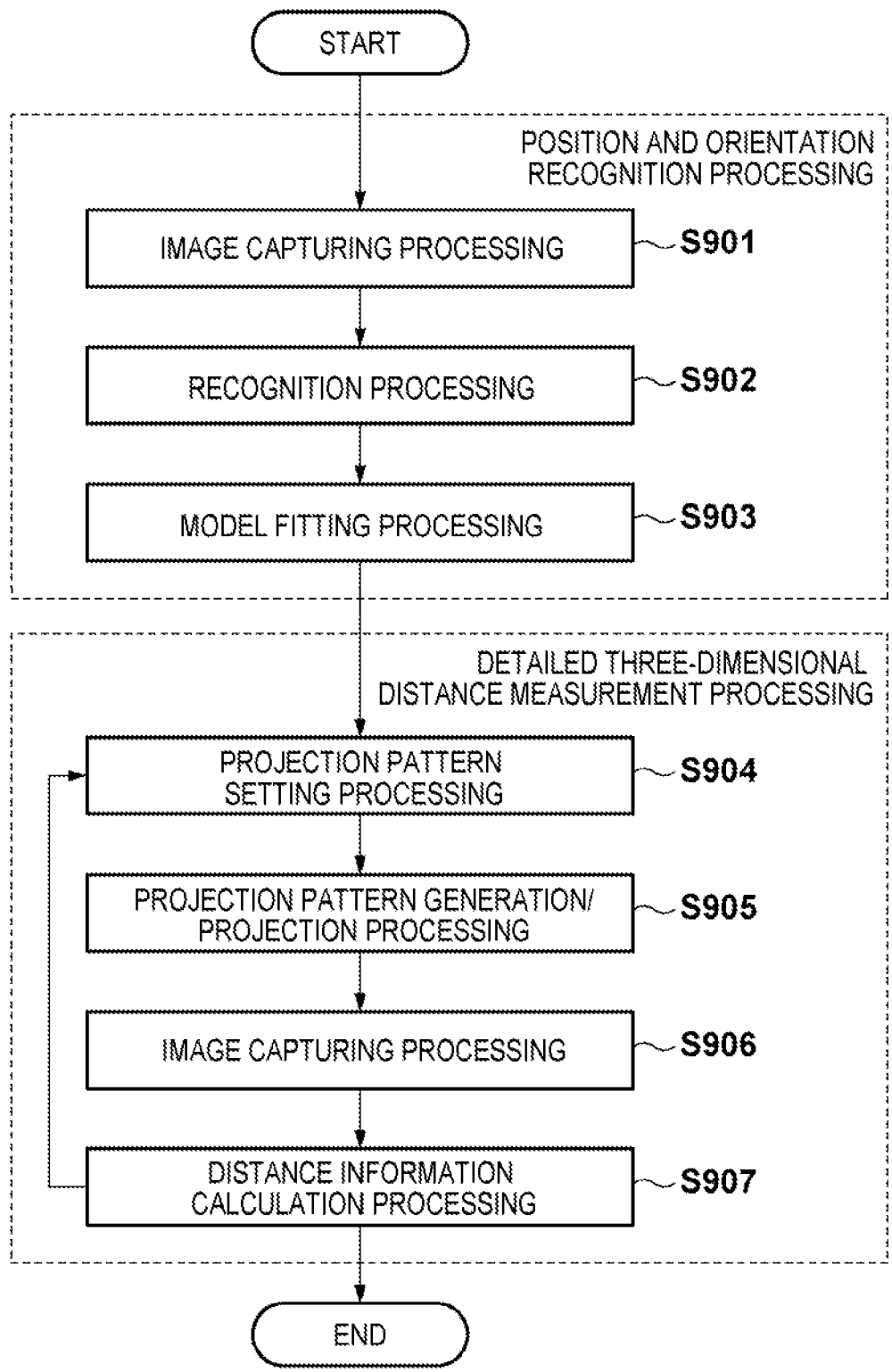

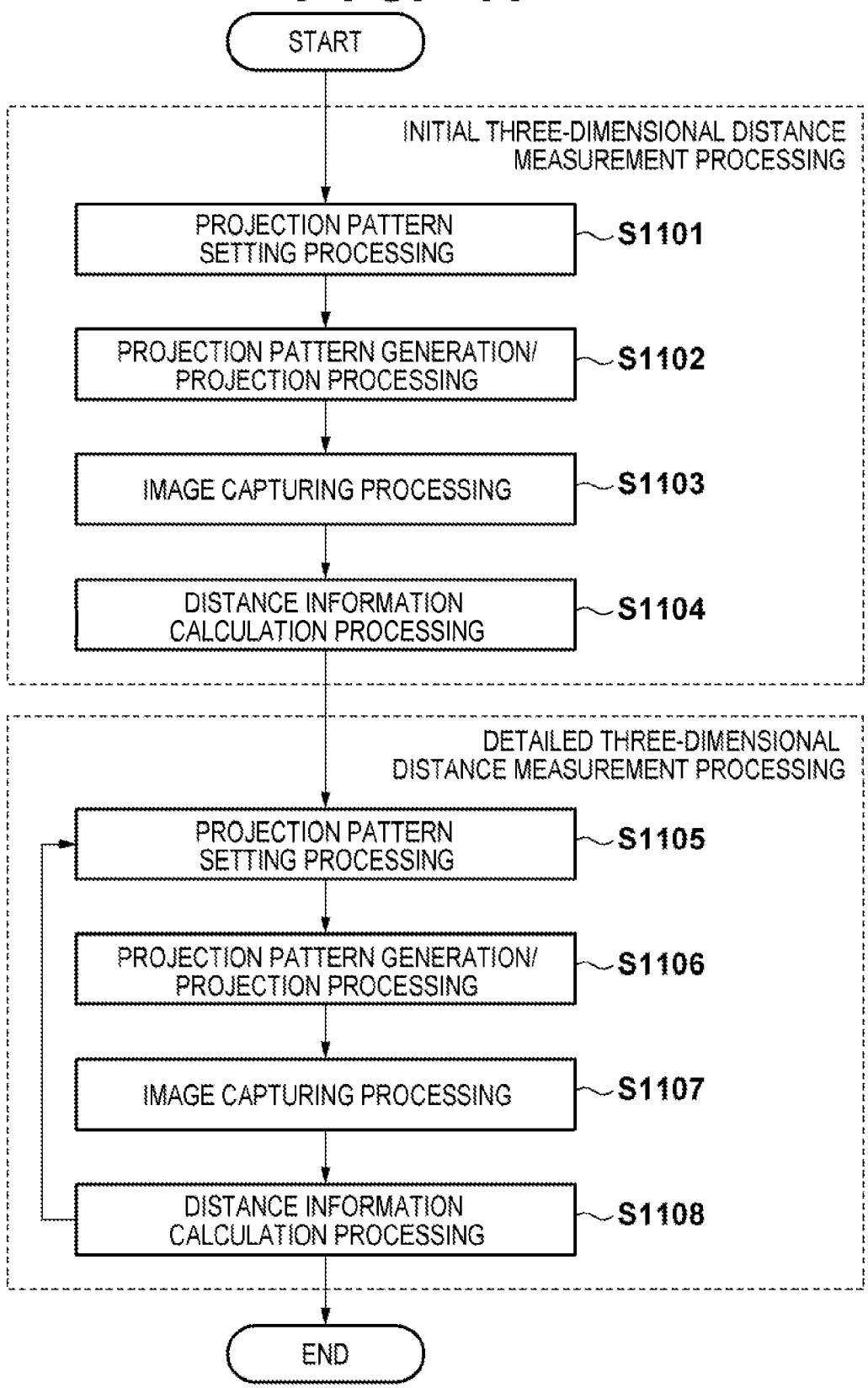

F I G. 12A
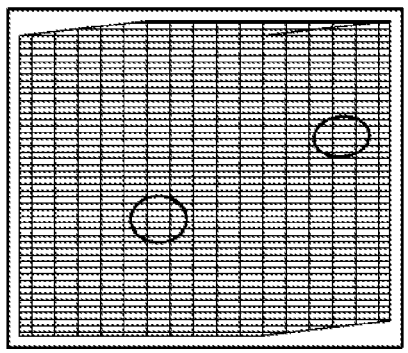
F I G. 12B
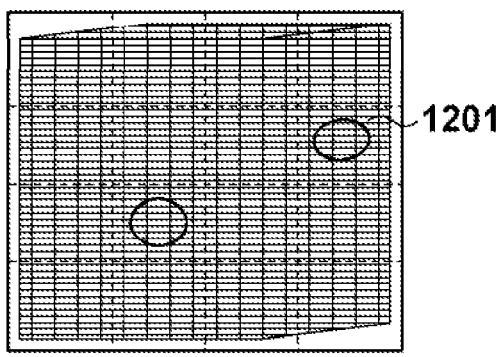
F I G. 12C
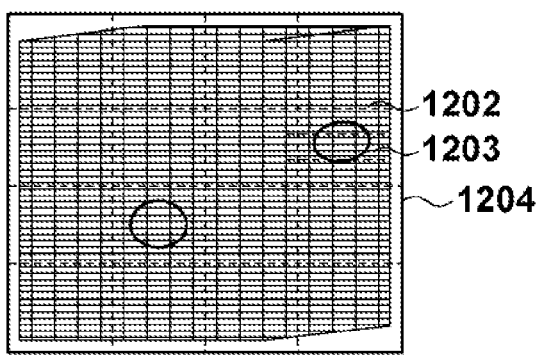

F I G. 14A
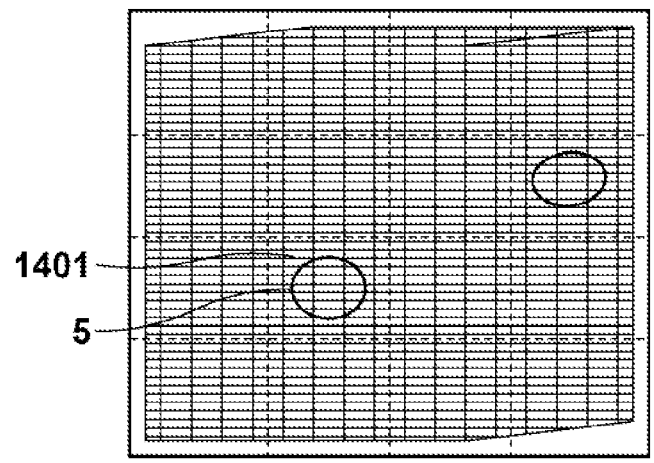
F I G. 14B
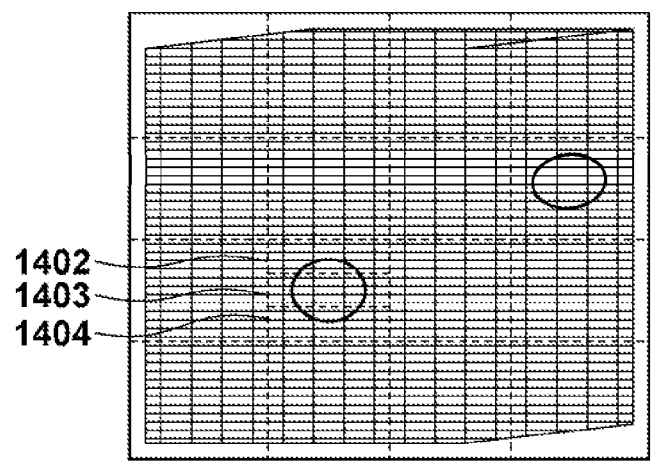
F I G. 15
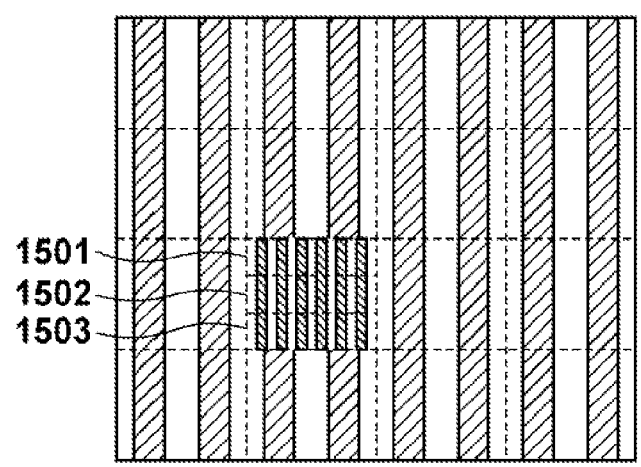

THREE-DIMENSIONAL DISTANCE MEASUREMENT APPARATUS, THREE-DIMENSIONAL DISTANCE MEASUREMENT METHOD, AND NON-TRANSITORY COMPUTER-READABLE STORAGE MEDIUM

BACKGROUND OF THE INVENTION

1. Field of the Invention

The present invention relates to a three-dimensional distance measurement apparatus, a three-dimensional distance measurement method, and a non-transitory computer-readable storage medium.

2. Description of the Related Art

Japanese Patent Laid-Open No. 2008-276743 discloses a three-dimensional distance measurement method in which the spatial resolution of a projection pattern for distance measurement points is different for each region in measuring the three-dimensional distance using pattern projection.

In the three-dimensional distance measurement method described in Japanese Patent Laid-Open No. 2008-276743, distance patterns between measurement lines in a projection pattern having measurement lines (distance measurement points) embedded with identification information may have two distances.

Thomas P. Koninckx, Andreas Griesser and Luc Van Gool, "Real-time Range Scanning of Deformable Surfaces by Adaptively Coded Structured Light", 3DIM 2003. Proceedings. Fourth International Conference, 293-300 discloses a three-dimensional distance measurement method using different feature patterns of reference lines. V. Lepetit and P. Fua, "Keypoint recognition using randomized trees", IEEE Transactions on Pattern Analysis and Machine Intelligence, vol. 28, no. 9, 2006 discloses a position and orientation measurement method using image features such as edges and feature points detected on a two-dimensional image. D. G. Lowe, "Fitting parameterized three-dimensional models to images", IEEE Transactions on Pattern Analysis and Machine Intelligence, vol. 13, no. 5, pp. 441-450, 1991 discloses a method of recognizing the position and orientation of a measurement object by performing model fitting to a two-dimensional image using model information stored in advance. Furthermore, Seiji Iguchi and Kosuke Sato, "Three-Dimensional Image Measurement" (Shokodo, 1990) discloses a method of calculating the three-dimensional distance information of a measurement object by projecting a plurality of projection patterns each embedded with code information on the measurement object and decoding the code information of a plurality of captured images.

In a conventional three-dimensional distance measurement method, since the spatial resolution patterns of measurement lines are limited to two types and to a direction perpendicular to the measurement lines, it is impossible to set the spatial resolution of distance measurement points for each arbitrary region. Furthermore, when parallel processing is executed by dividing a distance measurement region into a plurality of local regions, uniforming arithmetic processing amounts for respective local regions according to the spatial resolution of distance measurement points is not considered, thereby decreasing the effect of shortening the processing time by the parallel processing.

The present invention has been made in consideration of the above problems, and has as its object to set the spatial resolution of three-dimensional distance information for each local region, thereby executing efficient parallel processing.

SUMMARY OF THE INVENTION

According to one aspect of the present invention, there is provided a three-dimensional distance measurement apparatus comprising: a distance information calculation unit configured to calculate distance information of a measurement object based on a captured image of the measurement object on which pattern light is projected; and a local pattern setting unit configured to adaptively set a spatial resolution of measurement points of the pattern light for each local region, wherein the local pattern setting unit sets the spatial resolution of the measurement points of the pattern light based on information about an arithmetic amount of the distance information calculation unit.

According to one aspect of the present invention, there is provided a three-dimensional distance measurement method for a three-dimensional distance measurement apparatus, comprising: calculating, by a distance information calculation unit, distance information of a measurement object based on a captured image of the measurement object on which pattern light is projected; and adaptively setting, by a local pattern setting unit, a spatial resolution of measurement points of the pattern light for each local region, wherein in the adaptively setting, the spatial resolution of the measurement points of the pattern light is set based on information about an arithmetic amount of the distance information calculation unit.

According to one aspect of the present invention, there is provided a non-transitory computer-readable storage medium storing a computer program for causing a computer to function as a three-dimensional distance measurement apparatus, wherein the three-dimensional distance measurement apparatus comprises a distance information calculation unit configured to calculate distance information of a measurement object based on a captured image of the measurement object on which pattern light is projected, and a local pattern setting unit configured to adaptively set a spatial resolution of measurement points of the pattern light for each local region, and the local pattern setting unit sets the spatial resolution of the measurement points of the pattern light based on information about an arithmetic amount of the distance information calculation unit.

According to one aspect of the present invention, there is provided a three-dimensional distance measurement apparatus for capturing a measurement object on which a projection pattern has been projected, and calculating three-dimensional distance information of the measurement object based on the captured image, comprising: a division setting unit configured to divide the image into regions, and set a spatial resolution of measurement points forming the projection pattern for each region; and a calculation unit configured to parallelly calculate, for the respective regions, the three-dimensional distance information of the measurement object based on an association between measurement points forming the projection pattern and the measurement points detected from the image of the measurement object which has been captured by projecting the projection pattern having the spatial resolution, wherein the division setting unit divides the image into regions and sets the spatial resolution of the measurement points for each region so that arithmetic amounts for the respective regions by the calculation unit are uniformed.

Further features of the present invention will be apparent from the following description of exemplary embodiments with reference to the attached drawings.

BRIEF DESCRIPTION OF THE DRAWINGS

FIG. 2 is a flowchart illustrating a processing procedure according to the first embodiment;

FIG. 9 is a flowchart illustrating a processing procedure according to the second embodiment;

FIG. 11 is a flowchart illustrating a processing procedure according to the third embodiment;

FIGS. 12A to 12C are views showing a captured image example according to the third embodiment;

FIGS. 14A and 14B are views showing a captured image example according to the fourth embodiment; and FIG. 15 is a view showing an image capturing pattern example according to the fifth embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

The first embodiment of the present invention will be described below with reference to the accompanying drawings. In this embodiment, an example of a three-dimensional distance measurement apparatus which measures the three-dimensional distance information of a measurement object based on an image captured by projecting pattern light on the measurement object will be explained.

Figure 1A:
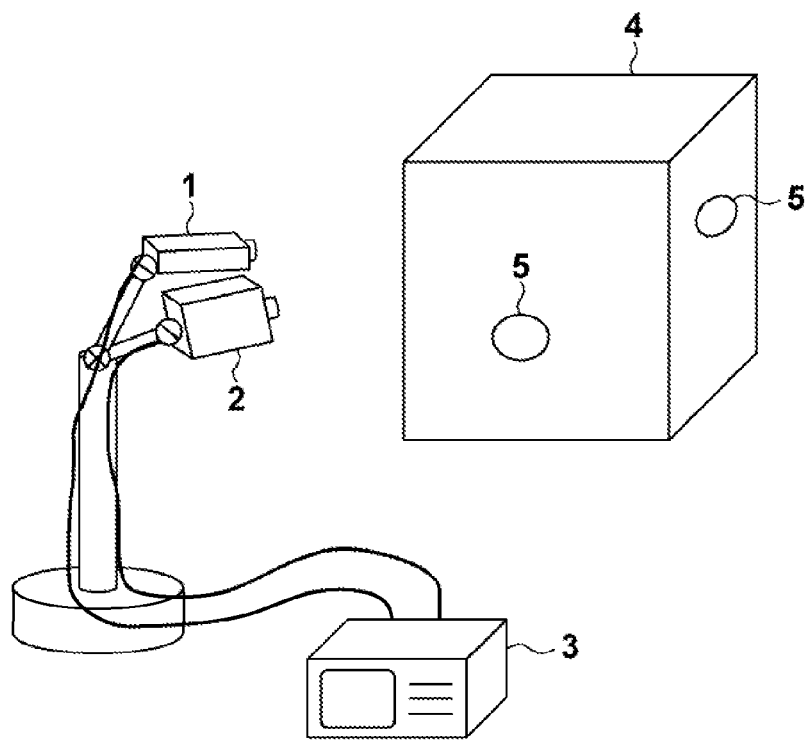
FIG. 1A is a view showing the configuration of a three-dimensional distance measurement apparatus according to the first embodiment.

As shown in FIG. 1A, a three-dimensional distance measurement apparatus according to the embodiment includes a projector 1, a camera 2, and a computer 3. The projector 1 projects, on a measurement object 4, pattern light (to also be referred to as a "projection pattern" hereinafter) based on pattern data set by the computer 3. The projection pattern is projection light based on the pattern data, and includes reference line patterns and measurement line patterns each formed by a plurality of measurement points in this embodiment. The measurement line patterns serve as multi-slit light for measuring the three-dimensional distance information of the measurement object 4.

The camera 2 has a function of capturing the measurement object 4 on which the projection pattern has been projected, and transmitting the captured image to the computer 3. The computer 3 has processing units (to be described later), and executes processing corresponding to each processing unit. Assume that the measurement object 4 in the embodiment is, for example, a cube as shown in FIG. 1A, and has recesses 5 on its surfaces.

Note that the computer 3 in the embodiment has a parallel processor including a plurality of processor units which can execute in parallel a plurality of arithmetic processing operations. Each of the above-described functions can generally be implemented by software or a dedicated arithmetic processing circuit.

Figure 1B:
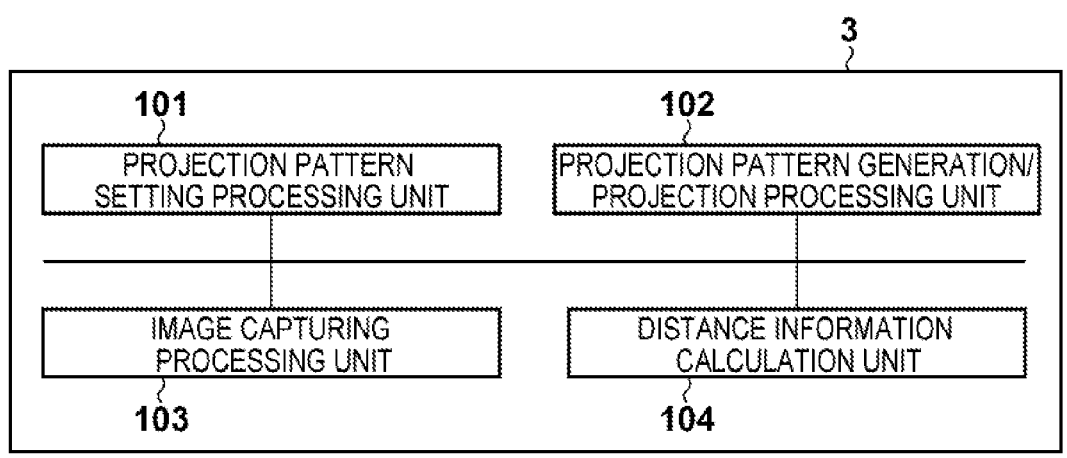
FIG. 1B is a block diagram for explaining the functional configuration of a computer 3 forming the three-dimensional distance measurement apparatus according to the first embodiment.

The functional configuration of the computer 3 forming the three-dimensional distance measurement apparatus according to the first embodiment will be described with reference to FIG. 1B. The computer 3 includes a projection pattern setting processing unit 101, a projection pattern generation/projection processing unit 102, an image capturing processing unit 103, and a distance information calculation unit 104. The processor units of the computer 3 control these components.

The projection pattern setting processing unit 101 can set a projection pattern which is to be projected on the measurement object 4 by the projector (local pattern setting processing). The projection pattern generation/projection processing unit 102 generates a projection pattern set by the projection pattern setting processing unit 101 (pattern light generation processing), and controls the projector 1 to project the generated projection pattern on the measurement object 4. The image capturing processing unit 103 controls the camera 2 to capture the measurement object 4 on which the projection pattern generated by the projection pattern generation/projection processing unit 102 has been projected. The unit 103 then transmits the captured image to the distance information calculation unit 104. The distance information calculation unit 104 executes image processing for the captured image received from the image capturing processing unit 103, and extracts pattern light from the captured image. The unit 104 then associates the pattern light (to also be referred to as an "image capturing pattern" hereinafter) in the captured image with the projection pattern to calculate the distance information from the camera 2 to the measurement object 4, that is, the three-dimensional distance information of the measurement object 4.

The processing procedure of the three-dimensional distance measurement apparatus according to the embodiment will be described with reference to a flowchart shown in FIG. 2.

The processing of the three-dimensional distance measurement apparatus according to the embodiment includes initial three-dimensional distance measurement processing (steps S201 to S204) and detailed three-dimensional distance measurement processing (steps S205 to S208), each of which is surrounded by dotted lines in FIG. 2. In the initial three-dimensional distance measurement processing, the three-dimensional distance information of the measurement object 4 in an initial state is acquired. The initial state indicates a state in which the three-dimensional distance information of the measurement object 4 is unknown. In actual measurement processing, however, the initial state is not limited to this, the initial three-dimensional distance measurement processing may be executed when the user requests. On the other hand, in the detailed three-dimensional distance measurement processing, the detailed three-dimensional distance information of the measurement object 4 is acquired based on the three-dimensional distance information in the initial state which has been calculated in the initial three-dimensional distance measurement processing.

In step S201, the projection pattern setting processing unit 101 sets a projection pattern which is to be projected on the measurement object 4 by the projector 1. The set projection pattern is used to calculate the three-dimensional distance information of the measurement object 4 in distance information calculation processing (to be described later).

Figure 3A:
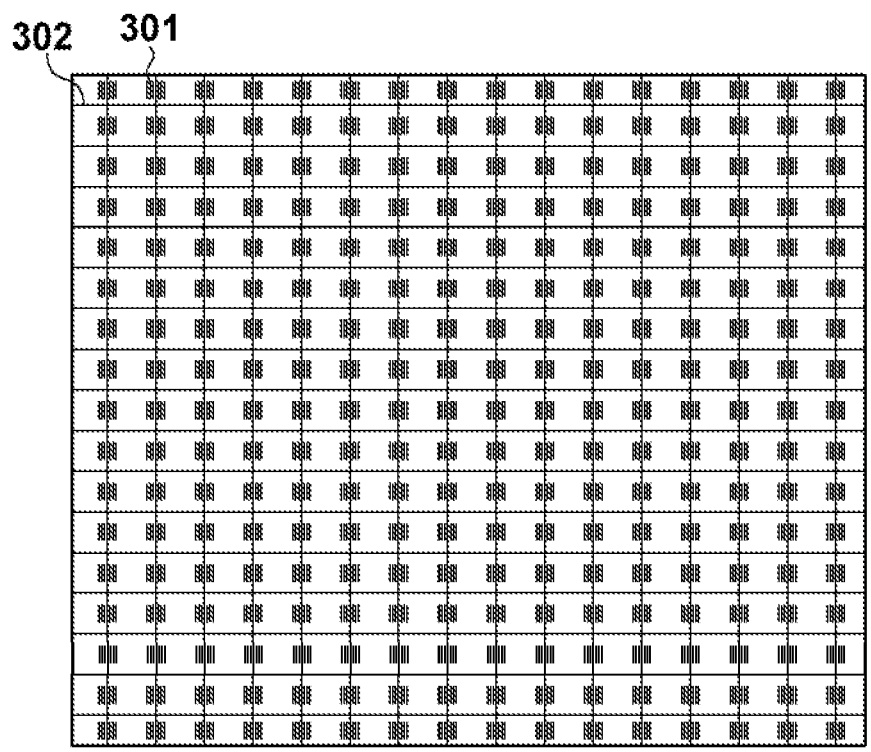
FIGS. 3A to 3C are views showing a projection pattern example according to the first embodiment.
Figure 3B:
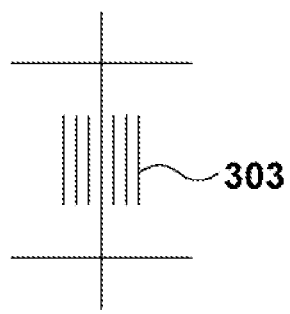
Figure 3C:
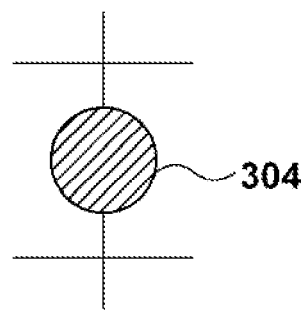

An example of the projection pattern set by the projection pattern setting processing unit 101 will be described with reference to FIG. 3A. A projection pattern shown in FIG. 3A includes reference line patterns 301 extending in the vertical direction, and measurement line patterns 302 extending in the horizontal direction. In FIG. 3A, only one reference line pattern is denoted by reference numeral 301. Similarly, only one measurement line pattern is denoted by reference numeral 302. In the reference line pattern 301, a barcode pattern is added, as a feature pattern for associating the projection pattern with the image capturing pattern, on a vertical line segment. FIG. 3B is an enlarged view showing a barcode pattern 303. Note that the feature pattern is not limited to the barcode pattern 303 and any other patterns may be used as long as it is possible to associate the projection pattern with the image capturing pattern. For example, FIG. 3C shows a circular shape pattern 304 as another pattern. It is also possible to associate the patterns by adding the shape pattern 304 shown in FIG. 3C on the reference line pattern 301 and coding a shape pattern array. A feature pattern may be set by having a plurality of colors in each portion of the reference line pattern 301. Unless otherwise specified, no feature pattern is drawn on the reference line pattern for the sake of simplicity.

The measurement line pattern 302 serves as multi-slit light for measuring the three-dimensional distance information of the measurement object 4. The three-dimensional distance information is calculated on a point on the measurement line pattern 302 of the image capturing pattern. The point on the measurement line pattern 302 corresponds to a pixel of the measurement line pattern 302 of the captured image. As will be described later, therefore, an arithmetic amount required to calculate the three-dimensional distance information is proportional to the number of pixels of the measurement line pattern 302 of the image capturing pattern. In this embodiment, assume that the three-dimensional distance information of the measurement object 4 in the initial state is unknown. In this case, in the initial three-dimensional distance measurement processing, the spatial resolution of measurement points forming the measurement line pattern 302 of the projection pattern is uniformly set in the whole pattern.

In step S202, the projection pattern generation/projection processing unit 102 generates the projection pattern set by the projection pattern setting processing unit 101 in step S201, and controls the projector 1 to project the generated projection pattern on the measurement object 4.

Figure 4A:
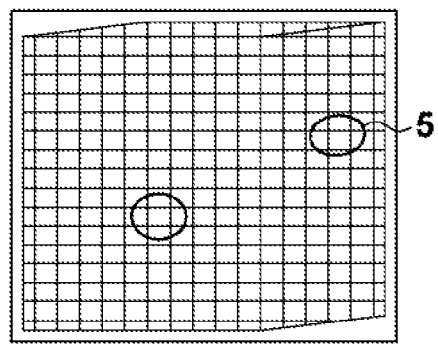
FIGS. 4A to 4C are views showing a captured image example according to the first embodiment.
Figure 4B:
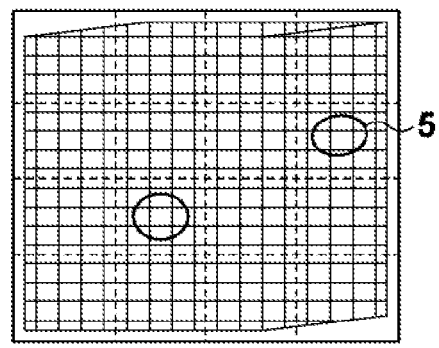
Figure 4C:
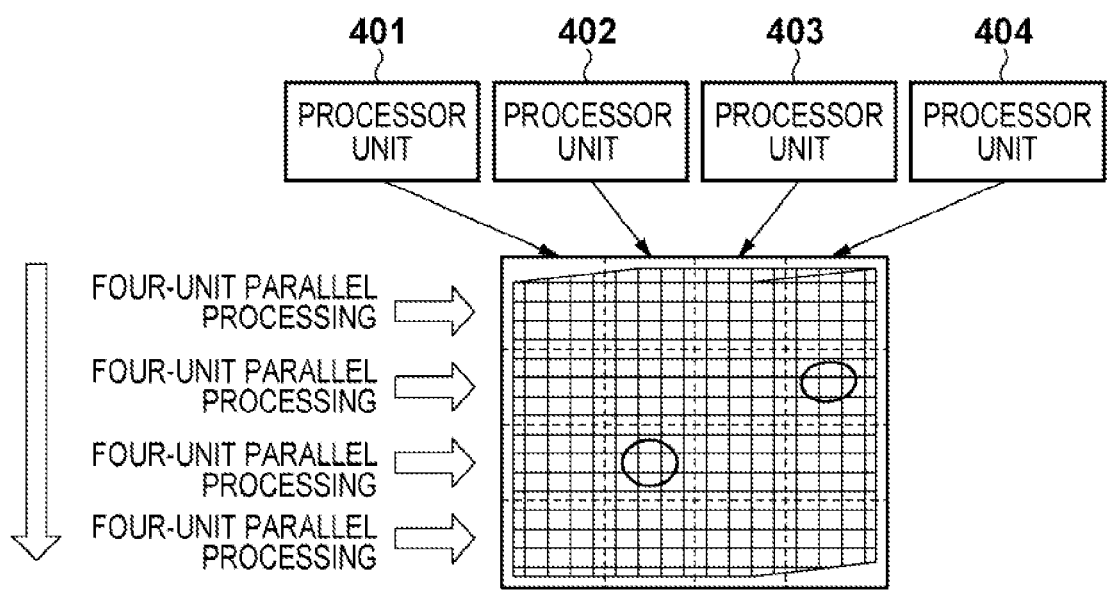

In step S203, the image capturing processing unit 103 controls the camera 2 to capture the measurement object 4 on which the projection pattern generated by the projection pattern generation/projection processing unit 102 has been projected. The unit 103 then transmits the captured image to the distance information calculation unit 104. FIG. 4A shows an example of the image captured by the camera 2. In step S204, the distance information calculation unit 104 executes image processing for the captured image received from the image capturing processing unit 103, and extracts pattern light from the captured image. The unit 104 then associates the image capturing pattern with the projection pattern to calculate the distance information from the camera 2 to the measurement object 4, that is, the three-dimensional distance information of the measurement object 4. Note that the computer 3 including the distance information calculation unit 104 according to this embodiment has a parallel processor including a plurality of processor units which can execute in parallel a plurality of arithmetic processing operations. The distance information calculation unit 104 divides the captured image into a plurality of local regions represented by regions drawn by dotted lines in FIG. 4B, and the plurality of processor units execute in parallel distance information calculation operations for the local regions, respectively. FIG. 4C is a schematic view showing the association between the distance information calculation operations for the respective local regions and the processor units. FIG. 4C shows a case in which the parallel processor has four processor units 401 to 404 and the captured image is divided into 16 local regions. Note that the sizes of the local regions of the captured image are equal to each other. In this case, one processor unit sequentially executes distance information calculation operations for four local regions. Note that the case shown in FIG. 4C is merely an example for explaining the concept of parallel processing in the embodiment. A combination of the number of processor units, the number of divided local regions, and the size of the local regions is not limited to the case shown in FIG. 4C. The distance information calculation operation for each local region of the captured image can be considered as individual arithmetic processing. The plurality of processor units, therefore, can execute the distance information calculation operations (to be described below) independently of each other.

The distance information calculation operation for each local region executed by each processor unit will be described. The distance information calculation operation of the embodiment is executed by detecting an image capturing pattern from the captured image, and determining the position of the projection pattern corresponding to the image capturing pattern based on the feature pattern of the reference line pattern 301 of the image capturing pattern. After associating the image capturing pattern with the projection pattern, the distance information calculation unit 104 can calculate the three-dimensional distance information of the measurement object 4 based on the measurement line pattern 302 of the image capturing pattern. In this embodiment, it is possible to use, as a three-dimensional distance measurement method executed for each local region of the captured image, a method described in Japanese Patent Laid-Open No. 2008-276743 or Thomas P. Koninckx, Andreas Griesser and Luc Van Gool, "Real-time Range Scanning of Deformable Surfaces by Adaptively Coded Structured Light", 3DIM 2003. Proceedings. Fourth International Conference, 293-300, or another three-dimensional distance measurement method using existing pattern light projection. Any method can be used, and a detailed description thereof will be omitted. Consequently, in step S204, the distance information calculation unit 104 can acquire three-dimensional distance information in the depth direction from the camera 2 to the measurement object 4 at a pixel position on the measurement line pattern 302 of the captured image.

The detailed three-dimensional distance measurement processing will be described. In step S205, based on the three-dimensional distance information calculated in the initial three-dimensional distance measurement processing, the projection pattern setting processing unit 101 sets a projection pattern which is to be projected on the measurement object 4 by the projector 1. The unit 101 also sets division of local regions in the captured image. The projection pattern setting will be described first. Consider, for example, a case in which the captured image in the initial three-dimensional distance measurement processing is the image shown in FIG. 4A. The spatial resolution of the measurement line patterns 302 of the image capturing pattern becomes relatively low in a portion of the surface of the measurement object 4 (for example, a side surface portion of the measurement object 4) where the distance fluctuation in the depth direction is large, and becomes relatively high in a portion (for example, a front surface portion of the measurement object 4) where the distance fluctuation is small. The portion where the distance fluctuation in the depth direction is large indicates a region where a variation in distance value is larger than a predetermined value. On the other hand, the portion where the distance fluctuation in the depth direction is small indicates a region where a variation in distance value is equal to or smaller than the predetermined value.

Since, as described above, the three-dimensional distance information is acquired at a pixel position on the measurement line pattern 302 of the captured image, it is possible to acquire only coarse three-dimensional distance information for the portion where the distance fluctuation in the depth direction is large. As shown in, for example, FIG. 4A, when the region of a side surface portion of the measurement object 4 for which it is possible to acquire only coarse three-dimensional distance information includes a portion (the recess 5 in this embodiment) which requires finer three-dimensional distance information, the accuracy of the acquired three-dimensional distance information is not high enough.

Figure 5A:
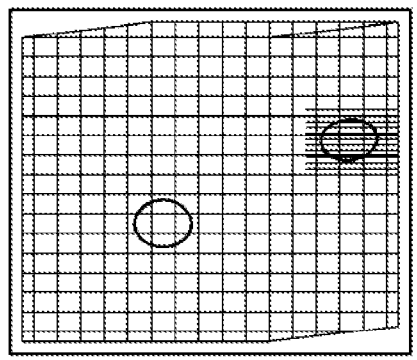
FIGS. 5A to 5C are views showing a captured image example according to the first embodiment.

In this embodiment, based on, for example, the three-dimensional distance information calculated in the initial three-dimensional distance measurement processing, the projection pattern setting processing unit 101 sets, to be high, the spatial resolution of the measurement line patterns 302 of the projection pattern to be projected on a region for which coarse three-dimensional distance information has been acquired. That is, the unit 101 sets a relatively high spatial resolution for a region for which coarse three-dimensional distance information has been acquired as compared with that for a region for which fine three-dimensional distance information has been acquired. FIG. 5A shows an example of a captured image when a projection pattern in which a high spatial resolution has been set for some of the measurement line patterns 302, that is, a projection pattern in which some pitches of the measurement line patterns 302 have been set to be small is projected on the measurement object 4. Note that a case in which the spatial resolution of the measurement line patterns 302 of the projection pattern to be projected on a region for which coarse three-dimensional distance information has been acquired is set to be high has been described above. As another method, however, the spatial resolution of the measurement line patterns 302 of the projection pattern to be projected on a region for which fine three-dimensional distance information has been acquired may be set to be low. Alternatively, a combination of the above methods may be used.

Figure 5B:
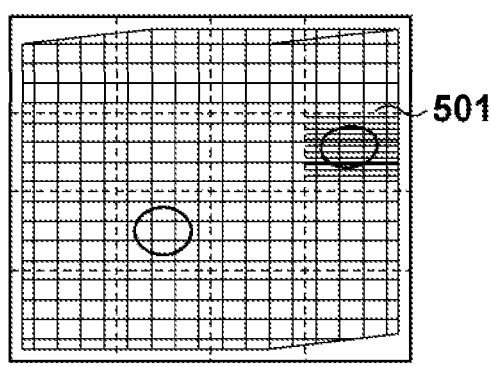

The division setting of local regions in the captured image by the projection pattern setting processing unit 101 will be explained. As described above, consider a case in which when the spatial resolution of some of the measurement line patterns 302 of the projection pattern is set to be high, parallel processing is executed for the local regions of the captured image using the parallel processor in the distance information calculation processing (to be described later) similarly to the initial three-dimensional distance measurement processing. In this case, arithmetic amounts for the respective local regions, which are determined based on the number of pixels on the measurement line patterns 302, are not uniform when the sizes of the local regions of the captured image are equal to each other. As shown in FIG. 5B, for example, when the spatial resolution of the measurement line patterns 302 corresponding to a local region 501 of the captured image is three times higher than that of other local regions, an arithmetic amount required for the distance information calculation processing in the local region 501 is about three times larger than that in another region. In the example shown in FIG. 5B, since the number of measurement line patterns 302 included in a local region positioned on the periphery of the captured image is slightly small, arithmetic amounts required for distance information calculation processing operations in the local regions except for the local region 501 are not exactly equal to each other. This, however, does not change the essential nature of nearly uniforming the arithmetic amounts (to be described later), and it is therefore assumed that the arithmetic amounts are almost equal to each other.

If the parallel processor executes the distance information calculation processing (to be described later), an arithmetic time for the local region 501 is about three times longer than that for other local regions. The parallel processor of this embodiment includes four processor units. When the distance information calculation processing operations for the local regions are execute in paralleled, the arithmetic time of the parallel processor is determined based on a longer arithmetic time. In the above-described example, let $3t$ be the arithmetic time for the local region 501 and t be the arithmetic time for other local regions. Then, a time $T_0$ required for the parallel arithmetic processing executed by the four processor units is represented by $$T_0 = t + t + t + 3t = 6t \quad (1)$$

In equation (1), the mathematical time of four-unit parallel processing executed by the four processor units, which includes the distance information calculation processing for the local region 501, is determined based on the arithmetic time for the local region 501, and is therefore represented by $3t$, while the mathematical time of four-unit parallel processing for each of the other local regions is represented by t.

Figure 5C:
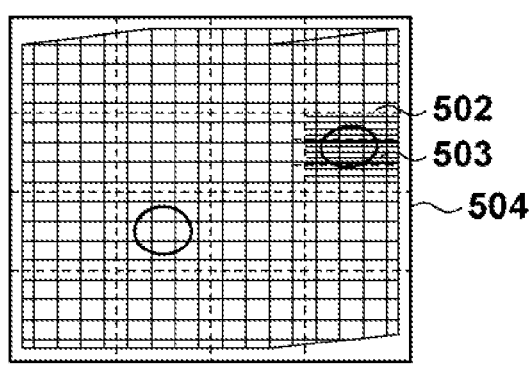

To nearly uniform the arithmetic amounts for the respective local regions, the local region 501 is divided into three local regions 502 to 504 shown in FIG. 5C, thereby executing parallel processing for the 18 local regions each requiring almost the same arithmetic amount. In this case, the parallel processing time by the four processor units is given by $$T_0 = t + t + t + t + t = 5t \quad (2)$$

The number of local regions increases from 16 to 18 to nearly uniform the arithmetic amounts for the respective local regions. Even if four-unit parallel arithmetic processing is repeated five times, however, it is possible to efficiently execute the parallel processing since the arithmetic amounts for the respective processor units are nearly uniformed. Note that parallel processing is executed by only two processor units for a fifth time. Therefore, it is possible to in turn shorten the total parallel processing time.

In this embodiment, based on the three-dimensional distance information calculated in the initial three-dimensional distance measurement processing, the projection pattern setting processing unit 101 sets a projection pattern in which the spatial resolution of the measurement line patterns 302 of the local region 501 in the image capturing pattern is set to be three times higher than that of another region. At the same time, the unit 101 divides the local region 501 into the three local regions 502 to 504 so that the size of a local region which serves as the arithmetic target of each processor unit in the distance information calculation processing (to be described later) becomes ⅓ of the size of other local regions.

Figure 6:
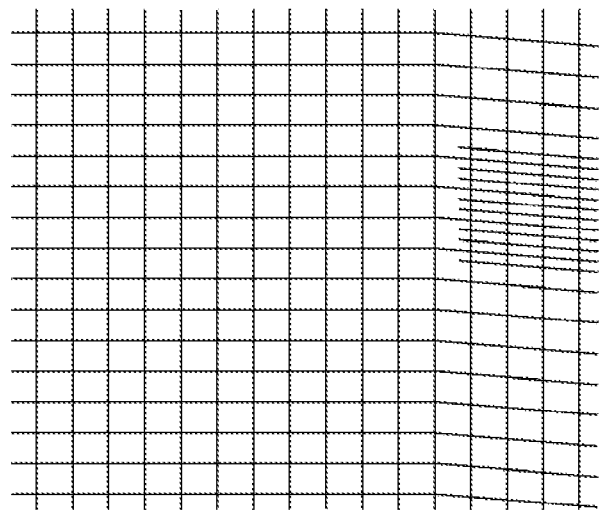
FIG. 6 is a view showing a projection pattern example according to the first embodiment.

Note that in the captured image example shown in FIG. 5C, the shape of a projection pattern is set in consideration of deformation due to projection, as shown in, for example, FIG. 6. Since the association between the image capturing pattern and the projection pattern is apparent from the result of the initial three-dimensional distance measurement processing, it is easy to set the shape of the projection pattern in consideration of a change due to projection. Note that it is not always necessary to divide a region into rectangles, and it is also possible to divide a region into a plurality of regions each having another arbitrary shape.

In step S206, the projection pattern generation/projection processing unit 102 generates the projection pattern set by the projection pattern setting processing unit 101 in step S205, and controls the projector 1 to project the generated projection pattern on the measurement object 4.

In step S207, the image capturing processing unit 103 controls the camera 2 to capture the measurement object 4 on which the projection pattern generated by the projection pattern generation/projection processing unit 102 has been projected. The unit 103 then transmits the captured image to the distance information calculation unit 104.

In step S208, the distance information calculation unit 104 executes image processing for the captured image received from the image capturing processing unit 103, and extracts pattern light from the captured image. The unit 104 then associates the image capturing pattern with the projection pattern to calculate the distance information from the camera 2 to the measurement object 4, that is, the three-dimensional distance information of the measurement object 4. At this time, the parallel processor executes distance information calculation operation for each divided region set by the projection pattern setting processing unit 101. Since the sizes of the local regions and the resolutions of measurement line patterns in the image capturing pattern have been set to nearly uniform the arithmetic amounts for the respective local regions, parallel processing executed by the parallel processor is efficiently performed. Then, the processing of the flowchart shown in FIG. 2 ends.

Note that, in the present invention, nearly uniforming indicates reducing variations in arithmetic amount to the extent that the target processing time of the parallel processing is achieved. For example, the example described using equations (1) and (2) shows a case in which the target processing time is set to 5*t* and variations in arithmetic amount are reduced to the extent that the processing time for each local region is t, thereby achieving the target processing time. As a result, by nearly uniforming the arithmetic amounts for the respective local regions, it is possible to obtain the effect of shortening the arithmetic processing time as compared with a case in which nearly uniforming is not considered.

After completion of the processing in step S208, it is possible to repeat, as needed, the detailed three-dimensional distance measurement processing described with reference to FIG. 2. In this case, it is only necessary to set, based on the result of immediately preceding detailed three-dimensional distance measurement processing, a projection pattern to be used in next detailed three-dimensional distance measurement processing.

Note that the number of processor units forming the parallel processor, the spatial resolutions of the measurement line patterns, and the sizes of the local regions described in this embodiment are merely examples for descriptive convenience, and another configuration may be used. For example, a region in which the spatial resolution of measurement line patterns is high may be set near a region where the fluctuation in three-dimensional distance information calculated in the initial three-dimensional distance measurement processing is large. Then, a projection pattern may be set by setting the size of each local region so that the ratio between a spatial resolution value and the number of pixels on measurement line patterns included in each local region is nearly uniform in all the local regions.

Alternatively, a combination of the spatial resolution of measurement line patterns and the size of each local region such that an arithmetic amount in the parallel processor is nearly uniformed may be calculated in advance, and may be stored as a reference table in the storage device of the computer 3. This functions as an arithmetic amount reference unit. In this case, when the projection pattern setting processing unit 101 refers to the reference table, a projection pattern can be set more easily. Any other methods may be used as long as the size of each local region and the spatial resolution of measurement line patterns in the projection pattern are set to nearly uniform the arithmetic amount in the parallel processor. The reference table may store the number of measurement points contained in each local region of pattern light, and correspondence information of the size and position of each local region and an arithmetic amount.

Note that a specially developed parallel processor or a commercially available parallel processor may be used as the parallel processor described in the embodiment. Alternatively, a combination of those parallel processors may be used. An example of the commercially available processor includes, for example, a multicore processor, GPU, and DSP incorporated in a commercially available PC. Any types of parallel processors may be used as long as it is possible to execute in parallel arithmetic operations.

In the embodiment, a case in which reference line patterns are associated with each other by a barcode has been described. If, however, reference line patterns are associated with each other by a combination of a plurality of feature patterns on the reference line patterns, part of a local region may be set to overlap with a neighboring local region. In association using a barcode which has been described above, it is assumed that a projection pattern is associated with an image capturing pattern for each barcode. However, a method of associating a projection pattern with an image capturing pattern by the arrangement of a plurality of barcodes (for example, three horizontally adjacent barcodes) is plausible. In this case, feature pattern variations are obtained by combining an information amount held by one barcode and that of the arrangement of a plurality of barcodes, thereby decreasing the information amount held by one barcode. To do this, adjacent local regions are set to partially overlap each other so that the arrangement of barcodes is completely included in either of the local regions. If a feature pattern is defined by the arrangement of three horizontally adjacent barcodes, an overlapping portion of adjacent local regions is set to include two or more horizontally adjacent barcodes. For example, as shown in an enlarged view of FIG. 7, for a local region 701 and each of local regions 702 to 704 which are adjacent to each other, the width of a portion 705 overlapping with both the local regions is set to include two horizontally adjacent barcodes. Note that the local region 701 is surrounded by dotted lines in FIG. 7. Each of the local regions 702 to 704 is surrounded by chain lines in FIG. 7. The portion 705 is represented by a rounded-corner rectangle with solid lines in FIG. 7.

Figure 7:
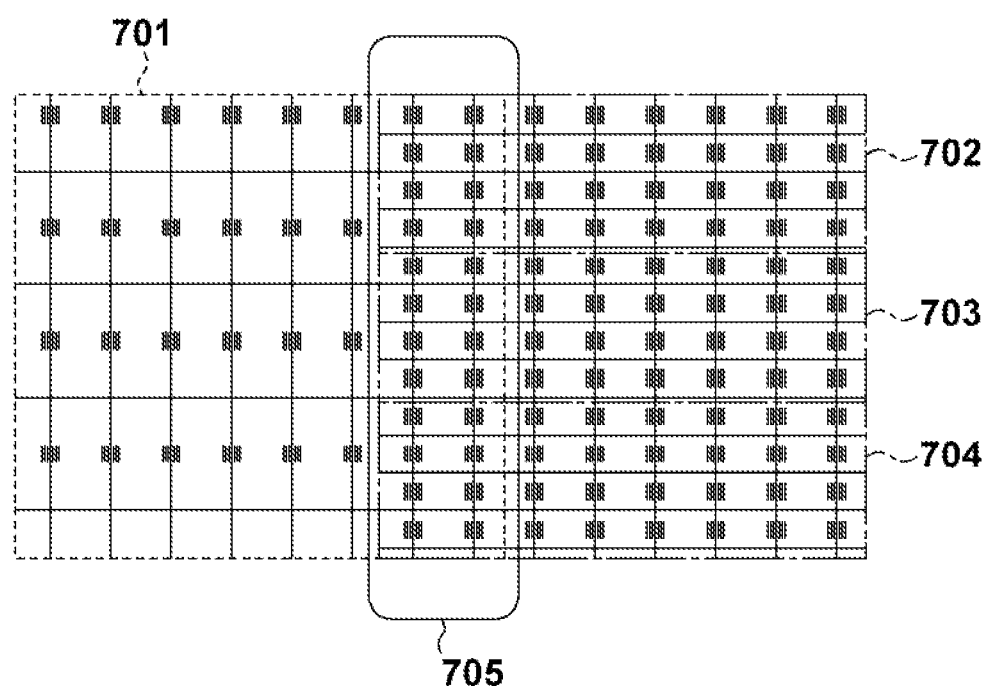
FIG. 7 is a view showing an image capturing pattern according to the first embodiment.

Different spatial resolutions may sometimes be set for measurement line patterns (line segments drawn by solid lines (horizontal lines) in FIG. 7) in the local region 701 and the local regions 702 to 704. In this case, a pattern having a high spatial resolution of measurement line patterns is set for the portion 705 overlapping with both the local regions. The measurement line patterns of the overlapping portion 705 as three-dimensional distance information calculation targets are thinned out to conform to the spatial resolution of a region other than the overlapping portion, thereby executing an arithmetic operation for the local region 701. For example, in FIG. 7, for the local region 701, only one of three measurement line patterns of the overlapping portion 705 is selected and sampled, thereby enabling to set, as three-dimensional distance information calculation targets, only measurement lines connected to measurement line patterns in a region except for the overlapping portion 705.

As another method, distance information may be calculated for measurement line patterns, the spatial resolution of which is high only in the overlapping portion 705 of the local region 701. In this case, it is possible to estimate the arithmetic amount of the local region 701 as a region, part of which has dense measurement line patterns. Note that it is only necessary to nearly uniform arithmetic amounts for three-dimensional distance information calculation in all the local regions by considering that the dense measurement line patterns in part of the local region 701 are arithmetic targets.

The function of the projection pattern setting processing unit 101 and that of the distance information calculation unit 104 may be incorporated in the camera 2.

As described above, according to this embodiment, it is possible to execute efficient parallel processing by adaptively setting, for each local region, the spatial resolution of three-dimensional distance information to be calculated.

Second Embodiment

The second embodiment of the present invention will be described below with reference to the accompanying drawings. A three-dimensional distance measurement apparatus according to the embodiment includes a projector 1, a camera 2, and a computer 3, similarly to the three-dimensional distance measurement apparatus according to the first embodiment described with reference to FIG. 1A. A measurement object 4 and recesses 5 are also the same as those in the first embodiment.

Figure 8:
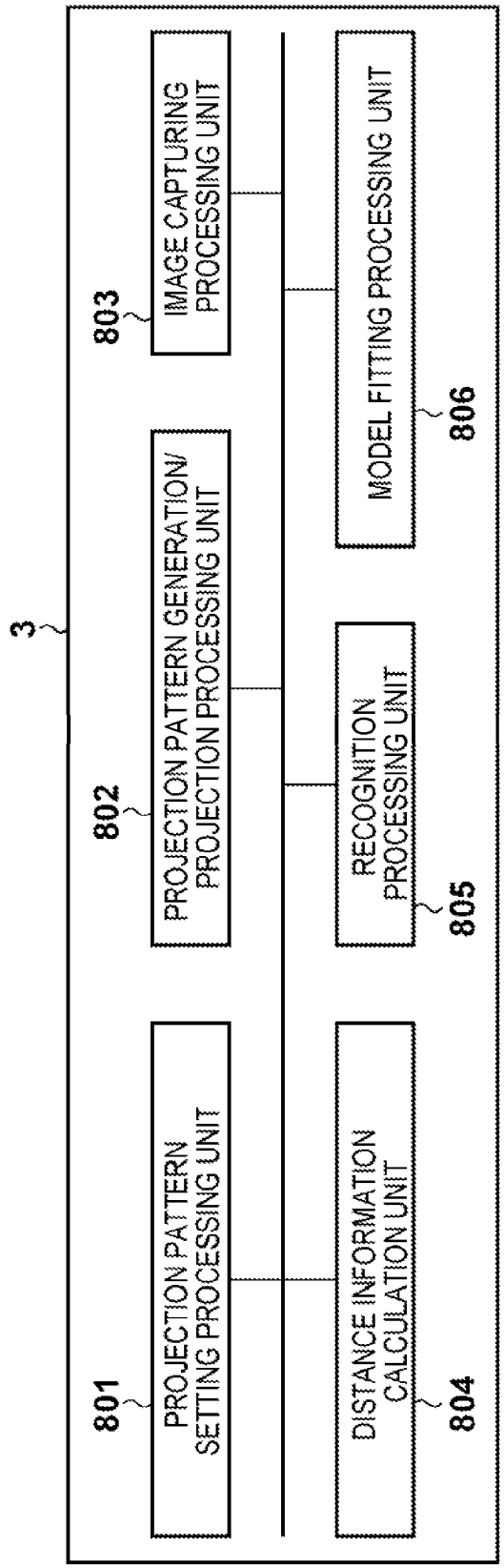
FIG. 8 is a block diagram for explaining the functional configuration of a computer 3 forming a three-dimensional distance measurement apparatus according to the second embodiment.

The functional configuration of the computer 3 forming the three-dimensional distance measurement apparatus according to the second embodiment will be described with reference to FIG. 8. The computer 3 includes a projection pattern setting processing unit 801, a projection pattern generation/projection processing unit 802, an image capturing processing unit 803, a distance information calculation unit 804, a recognition processing unit 805, a model fitting processing unit 806, and a model storage unit 807. The units 801 to 804 are the same as the units 101 to 104 described with reference to FIG. 1B, respectively.

The three-dimensional distance measurement apparatus according to this embodiment is different from the first embodiment in that the projection pattern setting processing unit 801 sets a projection pattern based on the coarse position and orientation information of the measurement object 4 recognized in advance and the model information of the measurement object 4.

The recognition processing unit 805 detects the measurement object 4 from a captured image, and also calculates the coarse position and orientation of the measurement object 4. The model fitting processing unit 806 recognizes the position and orientation of the measurement object 4 by setting, as an initial value, the coarse position and orientation calculated by the recognition processing unit 805, and performing model fitting to a two-dimensional image using the model information stored in advance. As described above, the second embodiment is different from the first embodiment in that recognition processing is executed for a captured image and a function of recognizing the position and orientation of the measurement object 4 is implemented based on the model information of the measurement object 4. The model storage unit 807 stores model information containing the shape data of the measurement object 4 and information about the spatial resolution of three-dimensional distance information for each local region, which should be calculated in detailed three-dimensional distance measurement processing (to be described later) on the surface of the measurement object 4.

The processing procedure of the three-dimensional distance measurement apparatus according to the embodiment will be described with reference to a flowchart shown in FIG. 9.

The processing of the three-dimensional distance measurement apparatus according to the embodiment includes position and orientation recognition processing (steps S901 to S903) and detailed three-dimensional distance measurement processing (steps S904 to S907), each of which is surrounded by dotted lines in FIG. 9.

In the position and orientation recognition processing, the coarse position and orientation of the measurement object 4 in an initial state is acquired, and is associated with the model information of the measurement object 4 which has been stored in advance. The model information contains the shape data of the measurement object 4 and information about the spatial resolution of three-dimensional distance information on the surface of the measurement object 4, which should be calculated in the detailed three-dimensional distance measurement processing (to be described later). The model information may contain the shape data of the measurement object 4 and surface optical characteristics (a reflectance, a transparency, an internal scattering ratio, and the like). Alternatively, the model information may contain only shape data. On the other hand, in the detailed three-dimensional distance measurement processing, the detailed three-dimensional distance information of the measurement object 4 is acquired based on the position and orientation recognition information of the measurement object 4 calculated in the position and orientation recognition processing and the model information of the measurement object 4 which has been stored in advance.

In step S901, the image capturing processing unit 803 controls the camera 2 to capture the measurement object 4. The unit 803 then transmits the captured image to the recognition processing unit 805. Uniform light is assumed in capturing an image. Although an illumination system which projects such light is not included in the three-dimensional distance measurement apparatus according to this embodiment, the projector 1 shown in FIG. 1A may project uniform light.

In step S902, the recognition processing unit 805 detects the measurement object 4 from the captured image, and also calculates the coarse position and orientation of the measurement object 4. As a method of measuring the coarse position and orientation of an object from a captured image, many position and orientation measurement methods using recognition processing are proposed. Assume, in this embodiment, that a method disclosed in Lepetit and P. Fua, "Keypoint recognition using randomized trees", IEEE Transactions on Pattern Analysis and Machine Intelligence, vol. 28, no. 9, 2006 is used. The present invention, however, is not limited to this.

In step S903, the model fitting processing unit 806 performs model fitting to a two-dimensional image using the model information stored in advance by considering, as an initial value, the coarse position and orientation calculated by the recognition processing unit 805. This enables to recognize the position and orientation of the measurement object 4. Assume, in this embodiment, that a method disclosed in D. G. Lowe, "Fitting parameterized three-dimensional models to images", IEEE Transactions on Pattern Analysis and Machine Intelligence, vol. 13, no. 5, pp. 441-450, 1991 is used. The present invention, however, is not limited to this.

The above-described position and orientation recognition processing allows to recognize the position and orientation of the measurement object 4, and to associate the measurement object 4 with its model information which has been stored in advance. Note that any other methods may be used as the position and orientation recognition processing as long as it is possible to associate, based on the captured image, the measurement object 4 with its model information which has been stored in advance. The method of recognizing the position and orientation of the measurement object 4 using the two-dimensional image has been explained. Another method using the three-dimensional distance information of the measurement object 4, which has been calculated in advance, may be used. These methods are not the main purpose of the present invention and a detailed description thereof will be omitted.

The detailed three-dimensional distance measurement processing will be described next. In step S904, based on the position and orientation recognition information of the measurement object 4 which has been calculated in the position and orientation recognition processing and the model information of the measurement object 4 which has been stored in advance, the projection pattern setting processing unit 801 sets a projection pattern which is to be projected on the measurement object 4 by the projector 1. The unit 801 also sets division of local regions in the captured image. The model information is stored in the model storage unit 807 of the computer 3. When the projection pattern setting processing unit 801 sets a projection pattern and division of local regions in the captured image, it sets the size of each local region to nearly uniform arithmetic amounts for distance information calculation in the respective local regions, similarly to the first embodiment.

Figure 10A:
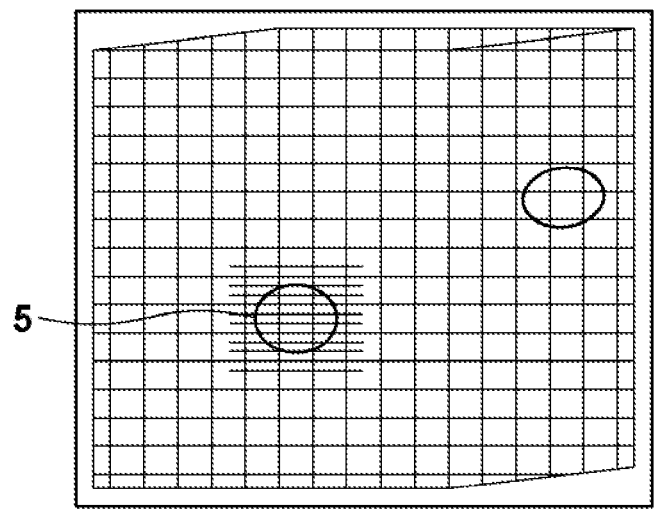
FIGS. 10A and 10B are views showing a captured image example according to the second embodiment.

In step S905, based on the three-dimensional distance information of each local region contained in the model information, the projection pattern generation/projection processing unit 802 sets the spatial resolution of the measurement line patterns of the local region in the projection pattern to comply with a necessary spatial resolution. FIG. 10A shows a captured image example when a projection pattern in which a high spatial resolution has been set for some measurement line patterns is projected on the measurement object 4. In FIG. 10A, based on the model information, the spatial resolution of the measurement line patterns of a region including the recess 5 on the front surface of the measurement object which requires finer three-dimensional distance information has been set to be high. Note that the spatial resolution of the measurement line patterns of a local region in the projection pattern can be arbitrarily set according to preset model information.

Figure 10B:
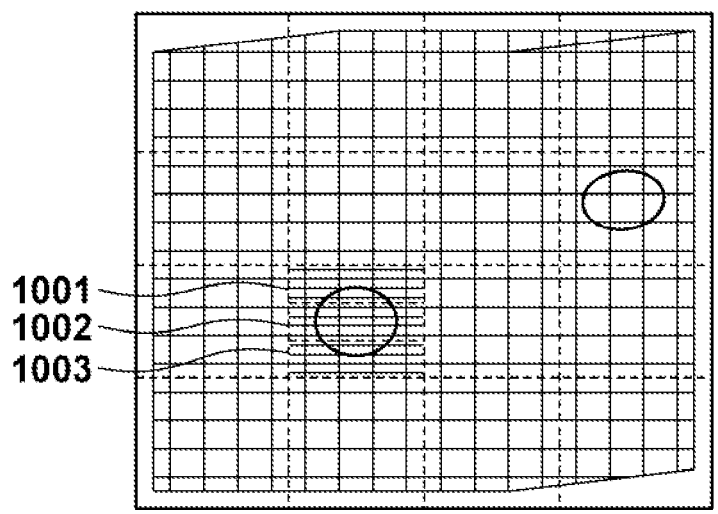

FIG. 10B shows a captured image example in which the local region including the recess 5 has been divided into three local regions 1001 to 1003 to nearly uniform the arithmetic amount necessary for distance information calculation processing. Note that the size of a local region may be preset in the model information. In step S905, the projection pattern generation/projection processing unit 802 generates the projection pattern set by the projection pattern setting processing unit 801 in step S904, and controls the projector 1 to project the generated projection pattern on the measurement object 4.

In step S906, the image capturing processing unit 803 controls the camera 2 to capture the measurement object 4 on which the projection pattern generated by the projection pattern generation/projection processing unit 802 has been projected. The unit 803 then transmits the captured image to the distance information calculation unit 804.

In step S907, the distance information calculation unit 804 executes image processing for the captured image received from the image capturing processing unit 803, and extracts pattern light from the captured image. The unit 804 then associates the image capturing pattern with the projection pattern to calculate the distance information from the camera 2 to the measurement object 4, that is, the three-dimensional distance information of the measurement object 4. At this time, a parallel processor executes a distance information calculation operation for each divided region set by the projection pattern setting processing unit 801. Since the sizes of the local regions and the resolutions of measurement line patterns in the image capturing pattern have been set to nearly uniform the arithmetic amounts for the respective local regions, parallel processing executed by the parallel processor is efficiently performed. Then, the processing of the flowchart shown in FIG. 9 ends. As a result, by nearly uniforming the arithmetic amounts for the respective local regions, it is possible to obtain the effect of shortening the arithmetic processing time as compared with a case in which nearly uniforming is not considered.

Similarly to the first embodiment, after completion of the distance information calculation processing in step S907, it is possible to repeat, as needed, the detailed three-dimensional distance measurement processing shown in FIG. 9. In this case, it is also possible to set, based on the result of immediately preceding detailed three-dimensional distance measurement processing, a projection pattern to be used in next detailed three-dimensional distance measurement processing.

As described above, according to this embodiment, it is possible to execute efficient parallel processing by adaptively setting, for each local region, the spatial resolution of three-dimensional distance information to be calculated.

Third Embodiment

The third embodiment of the present invention will be described below with reference to the accompanying drawings. A three-dimensional distance measurement apparatus according to the embodiment includes a projector 1, a camera 2, and a computer 3, similarly to the three-dimensional distance measurement apparatus according to the first embodiment described with reference to FIG. 1A. A measurement object 4 and recesses 5 are also the same as those in the first embodiment.

The functional configuration of the computer 3 forming the three-dimensional distance measurement apparatus according to the third embodiment is the same as that of the computer 3 forming the three-dimensional distance measurement apparatus according to the first embodiment. Note that the three-dimensional distance measurement apparatus according to this embodiment is different from the first embodiment in that, based on three-dimensional distance information calculated in initial three-dimensional distance measurement processing, a projection pattern setting processing unit 101 sets, for each local region, the sampling density of measurement line patterns as distance information calculation target points in distance information calculation processing of detailed three-dimensional distance measurement processing (to be described later). In this embodiment, only different points from the three-dimensional distance measurement apparatus according to the first embodiment will be described. Other parts are the same as those in the first embodiment and a description thereof will be omitted.

The processing procedure of the three-dimensional distance measurement apparatus according to this embodiment will be described with reference to a flowchart shown in FIG. 11.

The processing of the three-dimensional distance measurement apparatus according to the embodiment includes initial three-dimensional distance measurement processing (steps S1101 to S1104) and detailed three-dimensional distance measurement processing (steps S1105 to S1108), each of which is surrounded by dotted lines in FIG. 11.

The processing operations of the initial three-dimensional distance measurement processing (steps S1101 to S1104) are the same as those of the initial three-dimensional distance measurement processing (steps S201 to S204).

The processing operations of the detailed three-dimensional distance measurement processing (steps S1105 to S1108) will be described.

In step S1105, based on distance information calculated in the initial three-dimensional distance measurement processing, the projection pattern setting processing unit 101 sets the resolution of measurement line patterns in a projection pattern which is to be projected on the measurement object 4 by the projector 1.

In a region for which it is possible to acquire only coarse three-dimensional distance information in the initial three-dimensional distance measurement processing, for example, a higher spatial resolution is uniformly set for the measurement lines of the whole projection pattern so as to obtain finer three-dimensional distance information. Note that the spatial resolution of the measurement line patterns of the whole projection pattern in this embodiment is uniform unlike the first embodiment. FIG. 12A shows a captured image example when the projection pattern is projected on the measurement object 4.

In this embodiment, the projection pattern in the detailed three-dimensional distance measurement processing includes measurement line patterns, the spatial resolution of which is higher than that of a projection pattern in the initial three-dimensional distance measurement processing. However, the spatial resolution of the measurement line patterns is not limited to this, and may be equal to or lower than that in the initial three-dimensional distance measurement processing.

The projection pattern setting processing unit 101 also sets, for each local region, the sampling density of the measurement line patterns as distance information calculation targets in distance information calculation processing (step S1108) of the detailed three-dimensional distance measurement processing.

Referring to FIG. 12B, for example, based on the three-dimensional distance information calculated in the initial three-dimensional distance measurement processing, the calculated three-dimensional distance information is determined to be coarse in a local region 1201 in which the distance fluctuation range in the depth direction is wide. All measurement line patterns are, therefore, set as distance information calculation targets in the detailed three-dimensional distance measurement processing. In local regions except for a local region 1202, only some of measurement line patterns in the local regions are set as distance information calculation targets. In FIG. 12B, for example, in local regions except for the local region 1201, only one of three measurement line patterns as distance information calculation targets is sampled. Furthermore, the division size of local regions in the captured image is set.

That is, if the sampling density of the measurement line patterns as distance information calculation targets is different for each local region, parallel processing is executed for each local region of the captured image using a parallel processor in distance information calculation processing (to be described later), similarly to the initial three-dimensional distance measurement processing. In this case, arithmetic amounts for the respective local regions each of which is determined based on the number of pixels on measurement line patterns are not uniform when the local regions of the captured image have equal sizes. In the above-described example, the spatial resolution of the measurement line patterns as distance information calculation targets in the local region 1201 of the captured image is three times higher than that of measurement line patterns as distance information calculation targets in other local regions. An arithmetic amount for distance information calculation in the local region 1201 is three times larger than that in another local region. In this embodiment, therefore, to nearly uniform arithmetic amounts for the respective local regions similarly to the first embodiment, the local region 1201 is divided into local regions 1202 to 1204 as shown in FIG. 12C, and parallel processing is executed for 18 local regions each having almost the same arithmetic amount.

With this operation, the number of local regions increases from 16 to 18 but arithmetic amounts for respective processor units are nearly uniformed, similarly to the first embodiment. It is, therefore, possible to efficiently execute parallel processing, thereby shortening the total parallel processing time.

As described above, based on the three-dimensional distance information calculated in the initial three-dimensional distance measurement processing, the projection pattern setting processing unit 101 sets the sampling density of the measurement line patterns as distance information calculation targets in each local region except for the local region 1201 in the image capturing pattern to be ⅓ of the sampling density in the local region 1201. At the same time, the unit 101 divides the local region 1201 into the three local regions 1202 to 1204 so that the size of the divided local region becomes ⅓ of the size of each of the other local regions. Note that the divided region is not necessarily rectangular, and can have another arbitrary shape.

In step S1106, a projection pattern generation/projection processing unit 102 generates the projection pattern set by the projection pattern setting processing unit 101 in step S1105, and controls the projector 1 to project the generated projection pattern on the measurement object 4. The processing is different from the first embodiment in that the projection pattern including the measurement line patterns having the uniform spatial resolution is generated/projected, similarly to the initial three-dimensional distance measurement processing.

In step S1107, an image capturing processing unit 103 controls the camera 2 to capture the measurement object 4 on which the projection pattern generated by the projection pattern generation/projection processing unit 102 has been projected. The unit 103 then transmits the captured image to a distance information calculation unit 104.

In step S1108, the distance information calculation unit 104 executes image processing for the captured image received from the image capturing processing unit 103, and extracts pattern light from the captured image. The unit 104 then associates the image capturing pattern with the projection pattern to calculate the distance information from the camera 2 to the measurement object 4, that is, the three-dimensional distance information of the measurement object 4. At this time, the parallel processor executes distance information calculation operation for each divided region set by the projection pattern setting processing unit 101.

Since the sizes of the local regions and the sampling densities of the measurement line patterns in the image capturing pattern have been set to nearly uniform the arithmetic amounts for the respective local regions, parallel processing executed by the parallel processor is efficiently performed. As a result, by nearly uniforming the arithmetic amounts for the respective local regions, the arithmetic processing time is shortened as compared with a case in which this is not considered.

After completion of the distance information calculation processing (step S1108), it is possible to repeat the detailed three-dimensional distance measurement processing as needed. In this case, it is possible to execute next detailed three-dimensional distance measurement processing based on the result of immediately preceding detailed three-dimensional distance measurement processing.

Note that the number of processor units forming the parallel processor, the sampling densities of the measurement line patterns as arithmetic targets, and the sizes of the local regions described in this embodiment are merely examples for descriptive convenience. Similarly to the first embodiment, another configuration may be used. Furthermore, similarly to the first embodiment, any method may be used as long as the sampling densities of measurement line patterns as arithmetic targets and the sizes of local regions are set to nearly uniform the arithmetic amount in the parallel processor.

As described above, according to this embodiment, it is possible to execute efficient parallel processing by adaptively setting, for each local region, the spatial resolution of three-dimensional distance information to be calculated.

Fourth Embodiment

The fourth embodiment of the present invention will be described below with reference to the accompanying drawings. A three-dimensional distance measurement apparatus according to the embodiment includes a projector 1, a camera 2, and a computer 3, similarly to the three-dimensional distance measurement apparatus according to the first embodiment described with reference to FIG. 1A. A measurement object 4 and recesses 5 are also the same as those in the first embodiment.

The three-dimensional distance measurement apparatus according to this embodiment is different from the third embodiment in that measurement line patterns as distance information calculation targets in distance information calculation processing of detailed three-dimensional distance measurement processing are set based on the coarse position and orientation information of the measurement object 4 recognized in advance and the model information of the measurement object 4. In this embodiment, therefore, only different points from the three-dimensional distance measurement apparatus according to the third embodiment will be described. Other parts are the same as those in the third embodiment and a description thereof will be omitted.

The processing procedure of the three-dimensional distance measurement apparatus according to the embodiment will be described with reference to a flowchart shown in FIG. 13.

Figure 13:
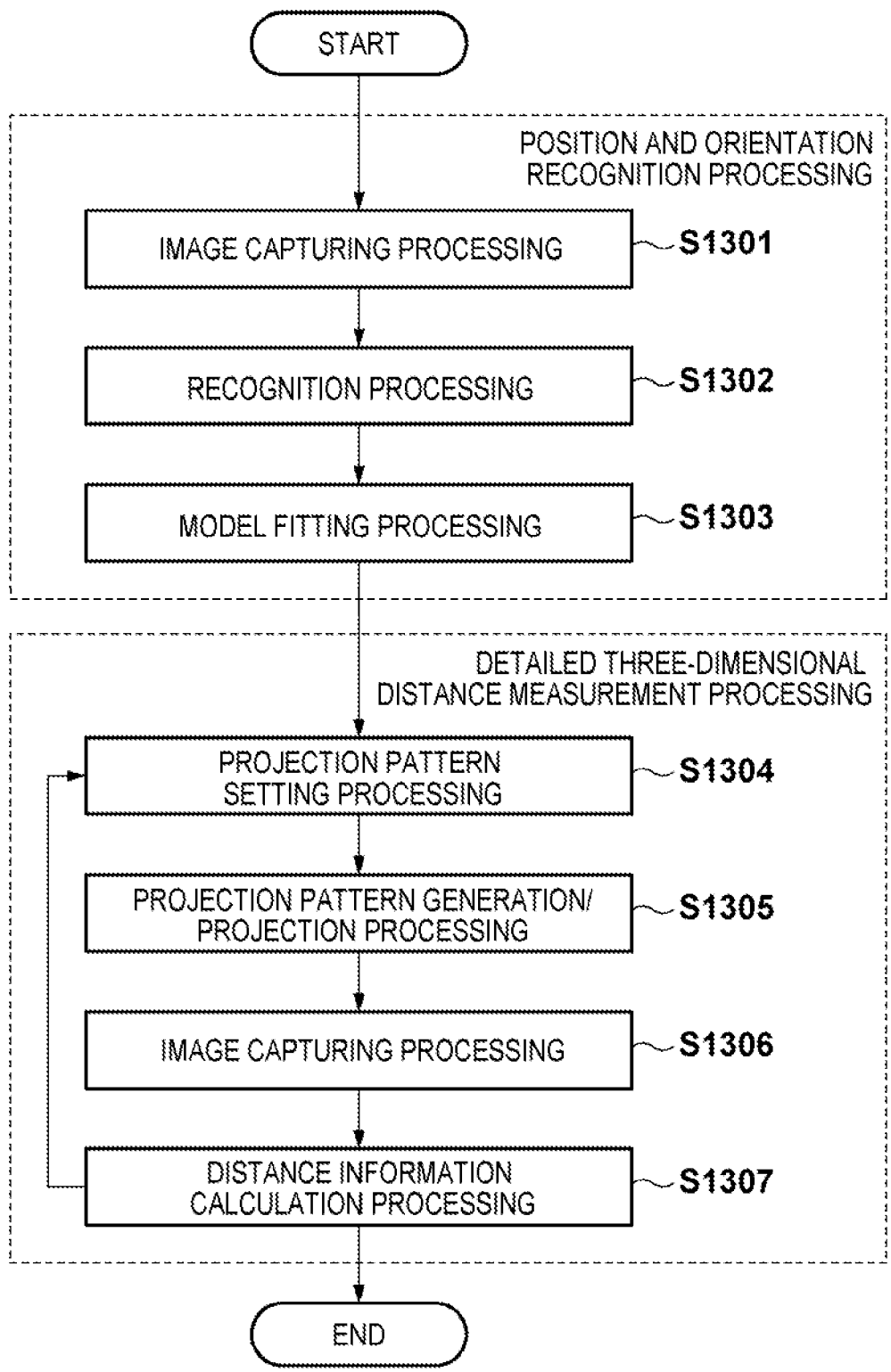
FIG. 13 is a flowchart illustrating a processing procedure according to the fourth embodiment.

The processing of the three-dimensional distance measurement apparatus according to the embodiment includes position and orientation recognition processing (steps S1301 to S1303) and detailed three-dimensional distance measurement processing (steps S1304 to S1307), each of which is surrounded by dotted lines in FIG. 13.

The processing operations of the position and orientation recognition processing (steps S1301 to S1303) are executed first. The processing operations are the same as those of the position and orientation recognition processing (steps S901 to S903) described in the second embodiment and a description thereof will be omitted.

The detailed three-dimensional distance measurement processing (steps S1304 to S1307) will be described next. Since the detailed three-dimensional distance measurement processing has been explained in the second embodiment, different points will be described.

In step S1304, based on the position and orientation recognition information of the measurement object 4 which has been calculated in the position and orientation recognition processing and the model information of the measurement object 4 which has been stored in advance, a projection pattern setting processing unit 101 sets the spatial resolution of a projection pattern which is to be projected on the measurement object 4 by the projector 1. By associating the set spatial resolution with the spatial resolution of each local region of tree-dimensional distance information contained in the model information, the unit 101 sets, for each local region, the sampling density of measurement line patterns as distance information calculation targets in distance information calculation processing (step S1307) of the detailed three-dimensional distance measurement processing.

Note that the measurement lines of the projection pattern in this embodiment have a uniform spatial resolution as a whole, unlike the first embodiment. This point is similar to the third embodiment. A captured image example when the projection pattern is projected on the measurement object 4 is as shown in FIG. 12A described in the third embodiment. The projection pattern setting processing unit 101 sets division of local regions in the captured image so that arithmetic amounts for the respective local regions are nearly uniformed according to the division size of the local regions and the sampling densities of the measurement line patterns, similarly to the third embodiment. As shown in FIG. 14A, for example, if the sampling density of measurement line patterns in each local region except for a local region 1401 including a recess 5 existing on the front surface portion of the measurement object 4 is set to be ⅓ of the sampling density in the local region 1401 by referring to the model information (only one of three measurement line patterns is sampled), arithmetic amounts for the respective local regions are nearly uniformed by dividing the local region 1401 into three local regions 1402 to 1404 as shown in FIG. 14B.

The processing operations in steps S1305 to S1307 are the same as those in the third embodiment, and a description thereof will be omitted.

As described above, according to this embodiment, it is possible to execute efficient parallel processing by adaptively setting, for each local region, the spatial resolution of three-dimensional distance information to be calculated.

Fifth Embodiment

The fifth embodiment of the present invention will be described below with reference to the accompanying drawings. A three-dimensional distance measurement apparatus according to the embodiment is different from the first to fourth embodiments in that a spatial coding method is used as a three-dimensional distance measurement method. In this embodiment, only different points from the three-dimensional distance measurement apparatus according to the first to fourth embodiments will be described. Other parts are the same as those in the first to fourth embodiments and a description thereof will be omitted. As disclosed in Seiji Iguchi and Kosuke Sato, "Three-Dimensional Image Measurement" (Shokodo, 1990), the spatial coding method is a method of calculating the three-dimensional distance information of a measurement object by projecting a plurality of projection patterns each embedded with code information on the measurement object and decoding the code information of a plurality of captured images.

Note that a method other than the spatial coding method can be used in the initial three-dimensional distance measurement processing according to the first and third embodiments but it is generally more efficient to use the same method in the initial three-dimensional distance measurement processing.

An application example of the spatial coding method in detailed three-dimensional distance measurement processing according to this embodiment will be described. Similarly to the first to fourth embodiments, in the detailed three-dimensional distance measurement processing, based on the result of the initial three-dimensional distance measurement processing or a coarse position and orientation recognition result, a different spatial resolution of three-dimensional distance data to be calculated is set for each local region of a captured image. That is, in the spatial coding method, since three-dimensional distance data is calculated on the boundaries between white lines and black lines of a code pattern at a lowest resolution, the resolution of the boundaries between the white lines and the black lines corresponds to the spatial resolution of measurement line patterns in the first to fourth embodiments.

If the resolution of the boundaries between white lines and black lines is set differently for each local region as needed, it is possible to efficiently perform parallel processing executed by a parallel processor similarly to the first to fourth embodiments by setting the sizes of the local regions to nearly uniform arithmetic amounts for distance information calculation in the respective local regions. As shown in FIG. 15, for example, if the resolution of the boundaries between white lines and black lines in each of local regions 1501 to 1503 of the captured image is set to be three times higher than that in another local region, the size of each of the local regions 1501 to 1503 is set to be ⅓ of the size of another local region, thereby nearly uniforming arithmetic amounts for distance information calculation in the respective local regions. Note that in FIG. 15, the boundaries between local regions are represented by dotted lines and black line portions of the code pattern are hatched.

As described above, according to this embodiment, it is possible to execute efficient parallel processing by adaptively setting, for each local region, the spatial resolution of three-dimensional distance information to be calculated even when the spatial coding method is used as a three-dimensional distance measurement method.

According to the present invention, it is possible to set the spatial resolution of three-dimensional distance information for each local region, and execute efficient parallel processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-058298 filed on Mar. 16, 2011, which is hereby incorporated by reference herein in its entirety.

What is claimed is:

1. A three-dimensional distance measurement apparatus comprising:
    a pattern light generation unit configured to generate pattern light;
    a position and orientation recognition unit configured to recognize coarse position and orientation of a measurement object;
    a model storage unit configured to store, as model information of the measurement object, a spatial resolution of distance information for each local region to be measured in the measurement object;
    a distance information calculation unit configured to calculate distance information of local regions of the measurement object based on a captured image of the measurement object on which the pattern light is projected; and
    a local pattern setting unit configured to adaptively set a spatial resolution of measurement points of the pattern light for each local region,
    wherein said local pattern setting unit sets the spatial resolution of the measurement points of the pattern light to substantially uniform arithmetic amounts for the respective local regions executed by said distance information calculation unit and based on a coarse position and orientation recognition result of the measurement object recognized in advance and the model information stored in said model storage unit.

2. The apparatus according to claim 1, wherein for the pattern light in the captured image, said distance information calculation unit sets, as distance information calculation target points, measurement points which have a different spatial resolution for each local region, that has been set by said local pattern setting unit, and which have been set to substantially uniform the arithmetic amounts for the respective local regions.

3. The apparatus according to claim 1, wherein said pattern light generation unit generates pattern light which has the different spatial resolutions of measurement points for the respective local regions, that have been set by said local pattern setting unit, and for which local regions and spatial resolutions of measurement points have been set to substantially uniform arithmetic amounts for the respective local regions.

4. The apparatus according to claim 1, wherein said distance information calculation unit has a parallel processor which execute in parallel arithmetic processing for the plurality of local regions.

5. The apparatus according to claim 1, wherein said local pattern setting unit sets local regions and spatial resolutions of measurement points based on distance information of the measurement object which has been measured in advance.

6. The apparatus according to claim 1, wherein based on the distance information of the measurement object which has been measured in advance, said local pattern setting unit sets the spatial resolution of the measurement points of the pattern light to be high in a local region in which a distance fluctuation range is wider than a predetermined value or sets the spatial resolution of the measurement points of the pattern light to be low in a local region in which a distance fluctuation range is narrower than the predetermined value.

7. The apparatus according to claim 1, wherein said local pattern setting unit sets a size and position of a local region according to the spatial resolution of the measurement points of the pattern light.

8. The apparatus according to claim 1, further comprising an arithmetic amount reference unit configured to store a number of measurement points included in each local region of the pattern light, and correspondence information of a size and position of each local region and an arithmetic amount.

9. The apparatus according to claim 4, wherein said parallel processor has a GPU or DSP.

10. A three-dimensional distance measurement method for a three-dimensional distance measurement apparatus, comprising:
generating the pattern light;
recognizing coarse position and orientation of the measurement object;
storing, as model information of a measurement object in a model storage unit, a spatial resolution of distance information for each local region to be measured in the measurement object;
calculating, by a distance information calculation unit, distance information of local regions of the measurement object based on a captured image of the measurement object on which pattern light is projected; and
adaptively setting, by a local pattern setting unit, a spatial resolution of measurement points of the pattern light for each local region,
wherein in the adaptively setting, the spatial resolution of the measurement points of the pattern light is set to substantially uniform arithmetic amounts for the respective local regions executed by the distance information calculation unit and based on a coarse position and orientation recognition result of the measurement object recognized in advance and the model information stored in the model storage unit.

11. A non-transitory computer-readable storage medium storing a computer program for causing a computer to function as a three-dimensional distance measurement apparatus, wherein
the three-dimensional distance measurement apparatus comprises
a pattern light generation unit configured to generate the pattern light,
a position and orientation recognition unit configured to recognize coarse position and orientation of a measurement object;
a model storage unit configured to store, as model information of the measurement local regions of the measurement object based on a captured image of the measurement object on measurement object,
a distance information calculation unit configured to calculate distance information of local regions of a measurement object based on a captured image of the measurement object on which pattern light is projected, and
a local pattern setting unit configured to adaptively set a spatial resolution of measurement points of the pattern light for each local region,
wherein the local pattern setting unit sets the spatial resolution of the measurement points of the pattern light to substantially uniform arithmetic amounts for the respective local regions executed by said distance information calculation unit and based on a coarse position and orientation recognition result of the measurement object recognized in advance and the model information stored in said model storage unit.

12. A three-dimensional distance measurement apparatus for capturing a measurement object on which a projection pattern has been projected, and calculating three-dimensional distance information of the measurement object based on the captured image, comprising:
a position and orientation recognition unit configured to recognize coarse position and orientation of the measurement object;
a model storage unit configured to store, as model information of the measurement object, a spatial resolution of distance information for each local region to be measured in the measurement object;
a division setting unit configured to divide the image into regions, and set a spatial resolution of measurement points forming the projection pattern for each region; and
a calculation unit configured to parallelly calculate, for the respective regions, the three-dimensional distance information of the measurement object based on an association between measurement points forming the projection pattern and the measurement points detected from the image of the measurement object which has been captured by projecting the projection pattern having the spatial resolution,
wherein said division setting unit divides the image into regions and sets the spatial resolution of the measurement points for each region so that arithmetic amounts for the respective regions by said calculation unit are uniformed based on a coarse position and orientation recognition result of the measurement object recognized in advance and the model information stored in said model storage unit.

* * * * *